UNITED STATES PATENT OFFICE.

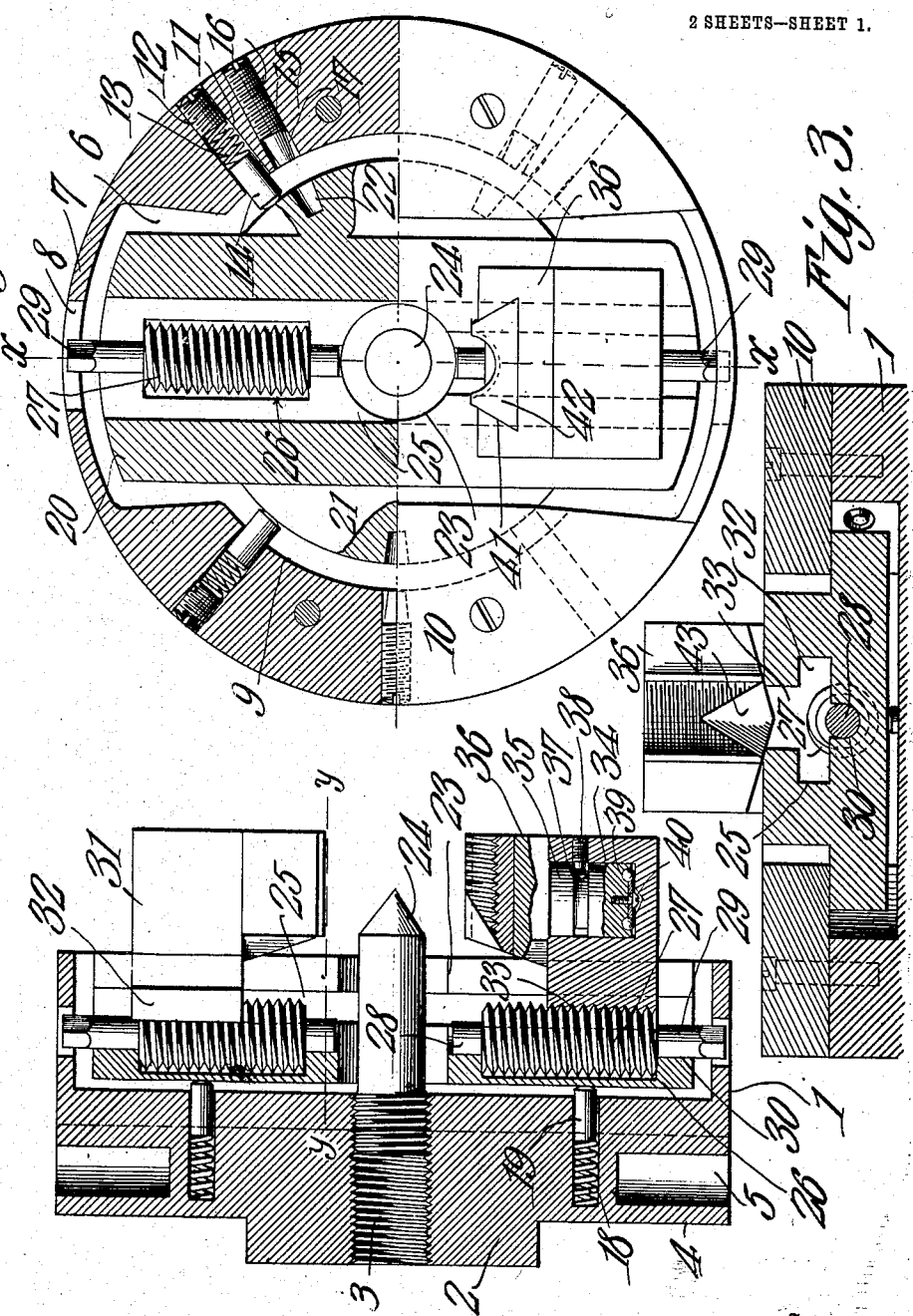

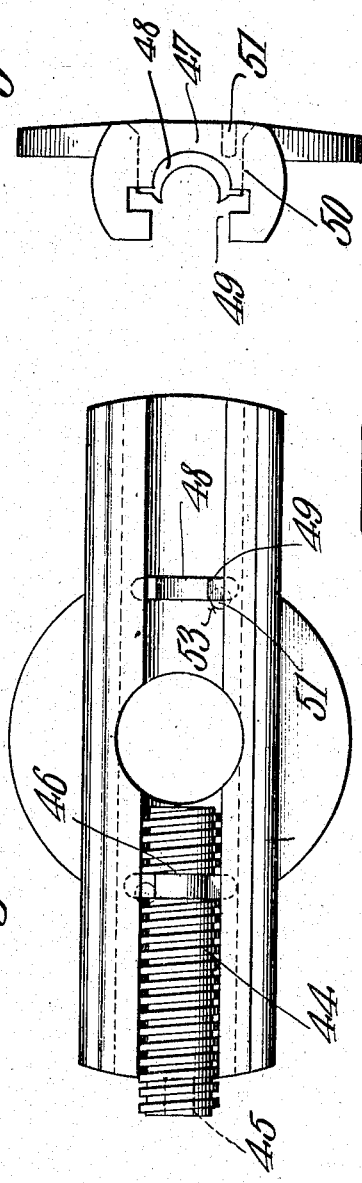

DAVID RANDOLPH McKIM, OF WEST JORDAN, UTAH.

LATHE-DOG.

No. 900,761.   Specification of Letters Patent.   Patented Oct. 13, 1908.

Application filed November 20, 1907. Serial No. 403,100.

*To all whom it may concern:*

Be it known that I, DAVID RANDOLPH McKIM, a citizen of the United States, residing at West Jordan, in the county of Salt Lake and State of Utah, have invented a new and useful Lathe-Dog, of which the following is a specification.

This invention relates to lathe dogs.

The object of the invention is to provide an adjustable extension dog of this character designed for driving work on lathe centers for either straight or taper work and independently of the lathe center, said means being disposed to shift to permit the necessary movement of the work during the operation of the lathe.

Another object of the invention is to provide jaws of novel form for engaging the work, said jaws being independently adjustable and capable of lapping the center of the dog or chuck so as to engage work of a very small diameter.

Another object is to provide an adjustable dog designed to be yieldingly held in a predetermined or normal position, there being separate means provided whereby the dog can be held rigidly in any position desired.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a view partly in front elevation and partly in section of a device embodying the present improvements. Fig. 2 is a section on line *x—x*, Fig. 1, one of the jaws being shown in elevation. Fig. 3 is a section on line *y—y*, Fig. 2. Fig. 4 is a plan view of a modified form of dog and showing one of the jaw adjusting screws in position therein. Fig. 5 is an end view of the dog. Figs. 6, 7, and 8 are side, plan, and end views respectively of one of the jaws. Fig. 9 is a detail view of one of the screw retaining devices.

Referring to the figures by characters of reference, 1 designates a preferably circular casing or driver having a central boss 2 upon its rear face into which extends a threaded bore 3 designed to receive the spindle of a lathe. Radially extending ribs 4 are arranged upon the rear face of the casing or driver 1 and have sockets 5 designed to receive pins to facilitate the rotation of the casing upon the lathe spindle.

Formed within the front face of the casing and extending diametrically therein is a recess 6 the opposite side walls of which diverge from the centers thereof to the ends of the recess, which ends are closed by thin peripheral portions 7 in which openings 8 are formed. Arcuate recesses 9 are formed in the side walls of recess 6 and the front or outer walls of these recesses may be formed of retaining means consisting of removable face plates 10 designed to be detachably secured in any preferred manner as by means of screws and having their inner or adjoining edges conforming in contour with the corresponding walls of the recess 6. Radially extending bores 11 are formed within the walls of the recesses 9 and receive screw plugs 12 insertible from the outside casing 1 and constituting abutments for springs 13. These springs serve to hold centering pins 14 normally projected into the recesses 9. Additional bores 15 are disposed radially within the walls of the recesses 9 and have their walls screw threaded so as to be engaged by locking screws 16 which are insertible from the outside of the casing 1 and having their inner ends tapered as at 17 and disposed to project into the recesses 9.

Formed within the inner or bottom face of recess 6 along a line intersecting the center of the casing are sockets 18 in each of which is mounted a spring pressed pin 19 designed to normally project into the recess 6. These pins constitute yieldable supports for a dog 20 which is substantially rectangular in outline and is disposed to fit loosely within recess 6. This dog has rounded wings 21 at the sides thereof projecting loosely into the recesses 9 and under the retaining means 10 and the dog and recess are so proportioned that said dog, when in its normal or central position, is capable of movement in any direction within the recess. The pins 14 constantly bear upon the wings 21 and as they are all subjected to the same pressure by springs 13 they serve to hold the dog normally centered within the recess. Sockets 22 are formed in the wings 21 and are designed to receive the tapered portions of screws 16 whenever it is desired to rigidly lock the dog within the recess.

A central orifice 23 is formed within the dog and a center 24 which is screwed into the bore 3 is designed to project through this orifice as indicated particularly in Fig. 2. A T-shaped groove 25 is formed longitudinally within, and extends throughout the length of the dog and is intersected at the center by the orifice 23. That portion of the groove at each side of the orifice has a recess 26 into which extends a screw 27 having stems 28 and 29 projecting from its ends and journaled within recesses 30 as indicated particularly in Fig. 3. Stems 29 extend loosely into the openings 8 and are provided with angular heads designed to be engaged by a wrench so that said stems can be conveniently rotated.

Mounted on the jaws adjacent opposite portions of the orifice 23 are oppositely disposed slides 31 each of which has a T-shaped extension 32 slidably mounted within the groove 25 and having a longitudinally threaded recess 32 slidably mounted within the groove 25 and having a longitudinally threaded recess 3 engaged by one of the screws 27. The slides are provided in their inner or adjoining faces with cylindrical sockets 34. Each socket is designed to receive a revoluble extension 35 projecting from a jaw 36. This extension has an annular groove 37 for the reception of a retaining screw or pin 38 and anti-friction devices such as balls 39 are preferably held upon the free end of the extension by means of a retaining washer 40 and are designed to bear on the inner wall of the socket 34. Rotation of the extension 35 is thus permitted with but little friction. As shown in Fig. 1 the inner or adjoining faces of jaws 36 are preferably provided with dovetailed grooves 41 in which are detachably mounted gripping blocks 42. The working faces of these blocks may be of any desired size and contour, according to the work to be clamped thereby. In the drawings said faces have been shown concaved longitudinally and screw threaded so as to efficiently engage a threaded object such as a bolt which is to be turned. The inner portion of the block 42 is preferably cut away as indicated at 43 so that the two blocks can be adjusted close to the center 24 and lap the same, thereby enabling them to engage work of small diameter.

For ordinary purposes the dog 20 can be held rigidly within recess 6 by adjusting the screws 16 into sockets 22. The jaws 36 can then be adjusted toward or from each other so as to engage opposite portions of work to be turned and which may be located upon the center 24. By disengaging the screws 16 from the dog the spring pressed pins 14 and 19 will hold the dog yieldably in centered position. Tapered work to be turned can then be secured in any position desired upon the dog by adjusting the jaws 36 and after the work has been properly secured by the jaws the dog is free to oscillate with the work. Inasmuch as the ends of the dog 20 project into the recesses 6 it will be obvious that said dog will be rotated with the driver 1 whether or not the screws 17 engage the dog. While the jaws have been shown provided with removable gripping blocks it is of course to be understood that if preferred the jaws may be used for gripping purposes although removable blocks such as disclosed are preferable.

Instead of providing the jaw adjusting screws as shown in Figs. 1, 2 and 3 each screw, as shown at 44 in fig. 4, may be provided within its outer end with an angular socket 45, said end being designed to project through the opening 8 and be engaged by a suitable wrench. Adjacent the inner end of the screw is formed an annular groove 46 disposed to receive a concave seat 47 formed in the outer end of a bearing block 48 having lips 49 designed to partly lap the screw so as to prevent it from becoming displaced. Each bearing block is seated within a slot or recess 50 formed within the dog and is held therein by means of a screw threaded key 51 which engages the registering recesses 52 and 53 formed within the bearing block and the dog respectively.

Instead of forming the jaws with anti-friction bearings and with gripping blocks, the jaws can be constructed as shown in Figs. 6, 7 and 8, each jaw being made of a single block of metal having a toothed recessed working face 54 while its bottom face is concave as indicated at 55 and provided with threads designed to engage the threads of the screw.

What is claimed is:

1. In a device of the character described the combination with a casing having a recess in one face thereof, and retaining means upon the casing; of a dog movably mounted within the recess, wings thereon lapped by the retaining means, resilient means for centering the dog within the recess, and adjustable jaws upon the dog.

2. The combination with a recessed casing; of a dog loosely mounted to be movable universally within the recess, radially disposed spring pressed means within the casing for centering the dog, spring pressed means within the casing for exerting an outward pressure upon the dog, and adjustable dogs upon the jaws.

3. In a device of the character described the combination with a revoluble casing having a recess; of a dog loosely mounted to be movable universally within the recess, retaining means for holding the dog within the recess, spring pressed centering means bearing upon the dog, spring pressed means for holding the dog normally against the retaining means, a center extending through the dog, and independently adjustable jaws upon the dog.

4. In a device of the character described the combination with a casing having a recess in one face thereof, and retaining means upon the casing; of a dog movably mounted within the recess, wings thereon lapped by the retaining means, adjustable jaws upon the dog, and resilient means for yieldingly holding the wings against the retaining means.

5. In a device of the character described the combination with a casing having a recess in one face thereof provided with recessed walls; of retaining means extending across the recessed walls, a dog movably mounted within the casing and having wings disposed within the recessed walls, jaws adjustably mounted upon the dog, and resilient means for holding the dog normally spaced from the bottom of the recess and with its wings against the retaining means.

6. In a device of the character described the combination with a casing having a recess in one face thereof, and a face plate; of a dog mounted to partly rotate and to oscillate within the recess, and yieldable means for normally holding the dog against the face plate and spaced from the bottom of the recess to prevent oscillation.

7. In a device of the character described the combination with a casing having a recess in one face thereof, and a face plate; of a dog mounted to partly rotate and to reciprocate and oscillate within the recess, and separate yieldable means for normally holding the dog against the face plate to prevent reciprocation and oscillation.

8. In a device of the character described the combination with a casing having a recess in one face thereof, and a face plate; of a dog mounted to partly rotate and to oscillate within the recess, yieldable means for normally holding the dog against the face plate and spaced from the bottom of the recess to prevent oscillation, and means adjustably mounted within the casing for engaging the dog to positively hold it against movement relative to the casing.

In testimony that I claim the foregoing as my own, I have hereto affixed my signature in the presence of two witnesses.

DAVID RANDOLPH McKIM

Witnesses:
JAMES CREIGHTON,
D. GORDON WOOD.